US010452855B2

(12) United States Patent
Ali et al.

(10) Patent No.: US 10,452,855 B2
(45) Date of Patent: *Oct. 22, 2019

(54) COMPOSITE DOCUMENT ACCESS

(71) Applicant: HEWLETT-PACKARD DEVELOPMENT COMPANY, L.P., Houston, TX (US)

(72) Inventors: Vali Ali, Houston, TX (US); Helen Balinsky, Bristol (GB)

(73) Assignee: Hewlett Packard Development Company, L.P., Spring, TX (US)

( * ) Notice: Subject to any disclaimer, the term of this patent is extended or adjusted under 35 U.S.C. 154(b) by 209 days.

This patent is subject to a terminal disclaimer.

(21) Appl. No.: 15/309,812

(22) PCT Filed: Aug. 12, 2014

(86) PCT No.: PCT/US2014/050720
§ 371 (c)(1),
(2) Date: Nov. 9, 2016

(87) PCT Pub. No.: WO2016/024954
PCT Pub. Date: Feb. 18, 2016

(65) Prior Publication Data
US 2017/0262642 A1    Sep. 14, 2017

(51) Int. Cl.
*G06F 11/30* (2006.01)
*G06F 12/14* (2006.01)
(Continued)

(52) U.S. Cl.
CPC .......... *G06F 21/6209* (2013.01); *G06F 21/31* (2013.01); *G06F 21/602* (2013.01);
(Continued)

(58) Field of Classification Search
CPC .... G06F 21/6209; G06F 21/31; G06F 21/602; G06F 2221/2141; G06F 2221/2115; G06Q 10/101
See application file for complete search history.

(56) References Cited

U.S. PATENT DOCUMENTS 8,316,237 B1  11/2012  Felsher et al.
8,689,352 B2   4/2014  Schaad et al.
(Continued)

FOREIGN PATENT DOCUMENTS

WO    2012/039703 A1   3/2012
WO    WO-2012039703 A1 3/2012

OTHER PUBLICATIONS

Yu-Cheng Hsiao and Gwan-Hwan Hwang, "Implementing the Chinese Wall Security Model in Workflow Management Systems," International Symposium on Parallel and Distributed Processing with Applications Sep. 6-9, 2010 pp. 574-541 IEEE.

(Continued)

*Primary Examiner* — Lynn D Feild
*Assistant Examiner* — Vadim Savenkov
(74) *Attorney, Agent, or Firm* — HPI Patent Department

(57) ABSTRACT

According to an example of accessing a composite document, a request to access a composite document is received. A key associated with a group is fetched, and the key is used to decrypt a part of the composite document comprising an attribute. In the event that the attribute is verified, access to the composite document is provided.

15 Claims, 6 Drawing Sheets

(51) Int. Cl.
*G06F 21/62* (2013.01)
*G06Q 10/10* (2012.01)
*G06F 21/31* (2013.01)
*G06F 21/60* (2013.01)

(52) U.S. Cl.
CPC .... *G06Q 10/101* (2013.01); *G06F 2221/2115* (2013.01); *G06F 2221/2141* (2013.01)

(56) References Cited

U.S. PATENT DOCUMENTS

| | | | | |
|---|---|---|---|---|
| 8,908,860 B2* | 12/2014 | Kobayashi | ............... | G06F 21/72 380/28 |
| 9,411,975 B2* | 8/2016 | Smith | ............... | G06F 21/6218 |
| 9,489,523 B2* | 11/2016 | Kohno | ............... | G06F 21/62 |
| 2003/0177378 A1* | 9/2003 | Wittkotter | ............... | G06F 21/10 713/193 |
| 2007/0143859 A1 | 6/2007 | Ogi et al. | | |
| 2007/0239998 A1 | 10/2007 | Beck et al. | | |
| 2008/0243856 A1 | 10/2008 | Corley et al. | | |
| 2008/0301141 A1 | 12/2008 | Banjou | | |
| 2009/0007249 A1 | 1/2009 | Lu et al. | | |
| 2009/0119755 A1 | 5/2009 | Kodimer et al. | | |
| 2010/0185852 A1* | 7/2010 | Ogawa | ............... | G06F 21/602 713/165 |
| 2012/0185701 A1 | 7/2012 | Balinsky et al. | | |
| 2012/0278631 A1 | 11/2012 | Balinsky et al. | | |
| 2012/0303968 A1 | 11/2012 | Balinsky et al. | | |
| 2012/0317414 A1* | 12/2012 | Glover | ............... | G06Q 10/101 713/165 |
| 2013/0124868 A1* | 5/2013 | Sorotokin | ............... | G06F 21/10 713/176 |
| 2013/0246474 A1 | 9/2013 | Victor | | |
| 2014/0157435 A1* | 6/2014 | Stamos | ............... | H04L 63/04 726/28 |
| 2015/0089665 A1* | 3/2015 | Nomura | ............... | G06F 21/62 726/27 |

OTHER PUBLICATIONS

A Composite Document Model and Its Access Control Scheme in Cloud Computing.

* cited by examiner

COMPOSITE DOCUMENT ACCESS

BACKGROUND

The creation, distribution, and exchange of digital documents has become a commonly accepted alternative to printing documents, both for purposes of efficiency and for environmental purposes. Examples of digital documents that may be created, distributed, or otherwise exchanged include, for instance, electronic word processing documents, electronic spreadsheets, electronic presentations, electronic drawings, portable document format (PDF) files, and web pages, e.g., HTML, CSS, or other web format files. Digital documents are often shared within or across groups, teams, departments, companies, or organizations.

Many digital documents, including shared documents, are a mixture, or a composite, of separate parts created in differing file formats. Different parts may be combined together through various mechanisms, including shareable files. One example of a composite document is a business proposal document including product images as JPEG files, a marketing video clip as a MPEG file, a PowerPoint presentation as a PPTX file, and a financial details spreadsheet as an XLSX file. Composite documents may be created or updated through specialized software as a single editable, browsable, searchable, approvable, or usable document, and shared amongst world-wide, distributed users.

DETAILED DESCRIPTION

Figure 1:
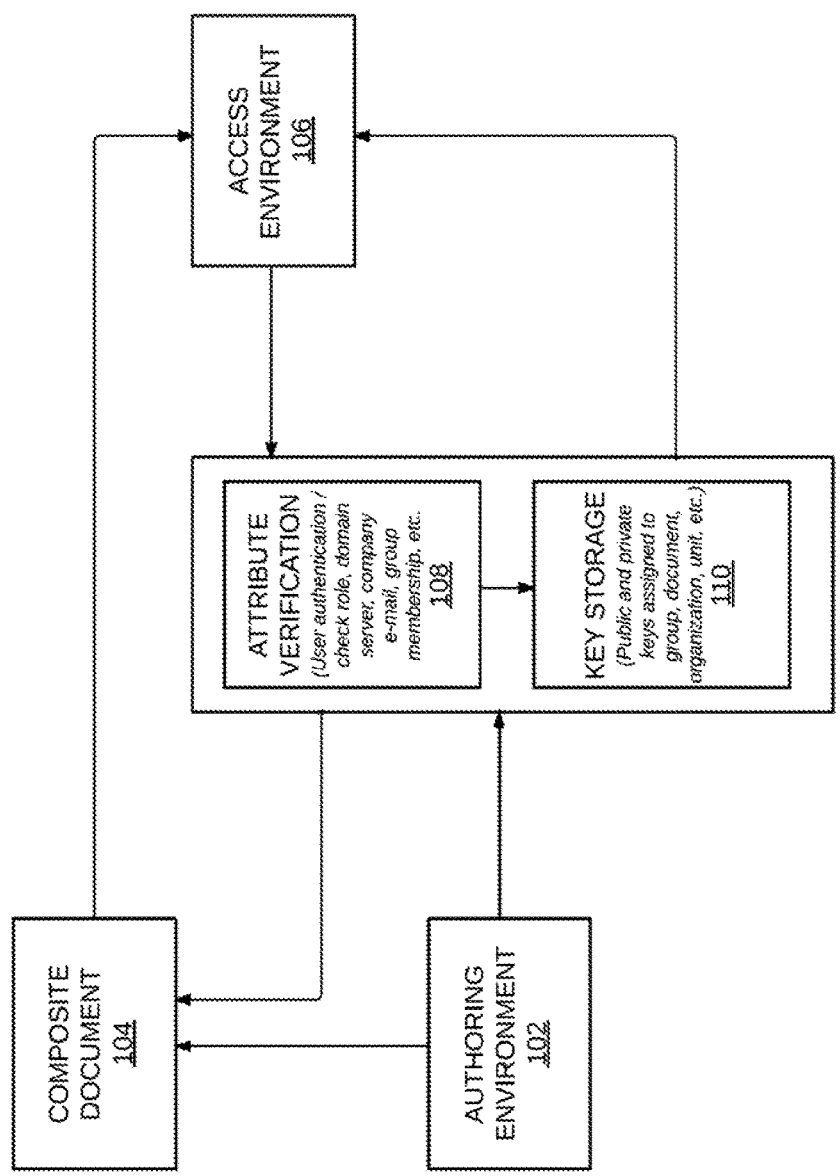
FIG. 1 illustrates a simplified block diagram of a digital document access workflow, according to an example of the present disclosure.

A composite document may be a mixture, or a composite, of separate content-parts created in different file formats that may be combined together through various mechanisms and distributed across, e.g., network environments. The content-parts may comprise a variety of individually addressable and accessible parts in the form of separate files or addressable file fragments. In one example, a composite document may be publicly-posted with access controls. In another example, a composite document may be used privately or Internally within an enterprise, or in mixed workflows across organizations, groups, departments or teams, with access controls. In some embodiments, a composite document or content-parts may be versioned.

In environments where the number of users accessing a composite document is small and pre-defined, controlling access to the composite documents may comprise using keys for each user to access the composite document or a content-part. In these examples, the number of keys may be manageable without significant overhead.

In some environments, e.g., a corporate environment where the number of users that may access a document is larger, or where users are unknown or undefined at the time a composite document is created, providing access to each user using the user's individual keys may not be practical, scalable, or even possible. For example, a composite document in a corporate environment may be accessible by 100,000 employees, and the employees entitled to access such a composite document, or content-parts in the composite document, may change on a daily or even hourly basis. Using individual keys, or keys wrapped in certificates, for each user would also require increasing the size and complexity of a composite document, and would also decrease performance by requiring the decryption of a large number of rows until a row for a particular user is found. Aside from this overhead at a security, code, and user management level, delays may be introduced into the workflow relating to system responsiveness and business continuity. For example, in some cases, processing of keys or other operations may be delayed when a large number of users are to join a group or receive access to a document.

According to an example of accessing a composite document in the present disclosure, when a request to access a composite document is received, a key associated with a group is fetched and the key is used to decrypt an entry table row in the composite document, or other part of the composite document containing an attribute (hereinafter "entry table"). An attribute stored in the entry table or document is verified, and in the event that the attribute is verified, access to the composite document is provided. Examples of attributes that may be verified or provable are membership in a group, whether a user can authenticate to a system, a user role, access to a domain server, location or physical presence at a particular site, access from a known IP address or subnet, authentication by a secure device or cryptographic key issued to a particular group, or ownership of a company or organization e-mail address.

In some examples, the private key may be associated with a group, document, organization, team, department, or other unit (collectively herein a "group"), which may allow for a smaller number of keys use to decrypt an entry table in a particular composite document, as opposed to using individual keys for each user. Similarly, association of a private key with more than one user may allow for dynamic binding of a user to a particular group, document, organization, or other unit based on, e.g., an attribute of the user.

In some examples, as discussed below in more detail, decryption of an entry table may comprise accessing at least one key in the entry table used to unlock a key map table in a composite document, which itself may be used to decrypt content-parts of the composite document. The keys in the entry table may only be released by a service, e.g., an attribute verification service, once a user has proven or verified an attribute such as membership in a group that is granted access to a composite document or content-part.

Accordingly, access to a composite document and/or content-part can effectively be granted, in a scalable approach, across users and different groups of users with various access levels, each accessing various attribute verification services that verify various attributes. A user may also be dynamically bound to a group or document at a time subsequent to the creation of the content-part, e.g., when joining a group, and without the need to store an individual entry in the composite document entry table decryptable only by a user's private key.

FIG. 1 illustrates a simplified block diagram of a digital document workflow, according to an example of the present disclosure. It should be understood that the diagram depicted in FIG. 1 represents a generalized illustration and that other components may be added, or existing components may be removed, modified, or rearranged without departing from the overall scope of the digital document workflow.

The digital document workflow, in an example, may include an authoring environment 102, a composite document 104, an access environment 106, an attribute verification module or service 108 ("attribute verification service"), and a key generation and storage module or service ("key storage service") 110.

As discussed in more detail below, authoring environment 102, access environment 106, attribute verification service 108, and key storage service 110 may comprise individual or shared hardware devices such as computers, servers, databases, processors, memory, and/or circuits, etc., configured with machine readable instructions to perform various functions in the digital document workflow. In addition, or alternatively, the components may comprise machine-readable instructions stored on computer-readable media. In some examples, authoring environment 102, access environment 106, attribute verification service 108, and key storage service 110 may be connected via the internet, cloud services, or other networks, as discussed below in more detail.

In an example, authoring environment 102 may package, encrypt, and sign content-parts of a digital document such that the resulting secure content-parts cannot be accessed without the appropriate keys. More specifically, authoring environment 102 may generate, or request, encryption and signature keys to encrypt and sign content-parts and/or entry table rows in a composite document.

In some examples, authoring environment 102 may allow for the creation or editing of attributes used to control access to a composite document or content-part, as discussed below in more detail. Authoring environment 102 may also allow for the selection or editing of an attribute verification service or key storage service associated with a particular composite document or content-part, also as discussed below in more detail.

In an example, access environment 106 may comprise or include a front-end software tool or graphical user interface ("GUI") for accessing a composite document 104. Access environment 106 may run on a user's computing device, such as, for example, a personal computer, a desktop computer, a laptop computer, a tablet, a personal digital assistant, a cellular telephone, a smartphone, or a consumer electronic device. Access environment 106 may be run as software, a service, or a combination of software and services.

In an example, access environment 106 may receive a composite document 104 and forward an attribute verification request to attribute verification service 108, as discussed below in more detail.

Attribute verification service 108 may comprise hardware and/or software to verify or confirm at least one attribute associated with a user requesting access to a composite document or content-part on access environment 106. For example, attribute verification service 108 may determine membership in a group; whether a user can authenticate to a system; a user role; access to a domain server; physical presence at a particular site; access from a known IP address; authentication by a secure device or cryptographic key issued to a particular group; ownership of a company or organization e-mail address; and other attributes and/or factors. In some cases, attribute verification service 108 may delegate attribute verification to a third-party service, such as a social media network. Attribute verification service 108 may store the information required to make such determinations internally, or may communicate with an external source, for example, an e-mail server, a Windows Domain access control system maintained by an organization, an LDAP-based authentication service, or a cloud-based service role/identity service.

In an example, attribute verification service 108 may communicate with key storage service 110 once attribute verification service 108 has verified a user attribute. As discussed below in more detail, key storage service 110 may contain, for example, public and private keys assigned to a group, document organization, department, team, or unit.

Figure 2:
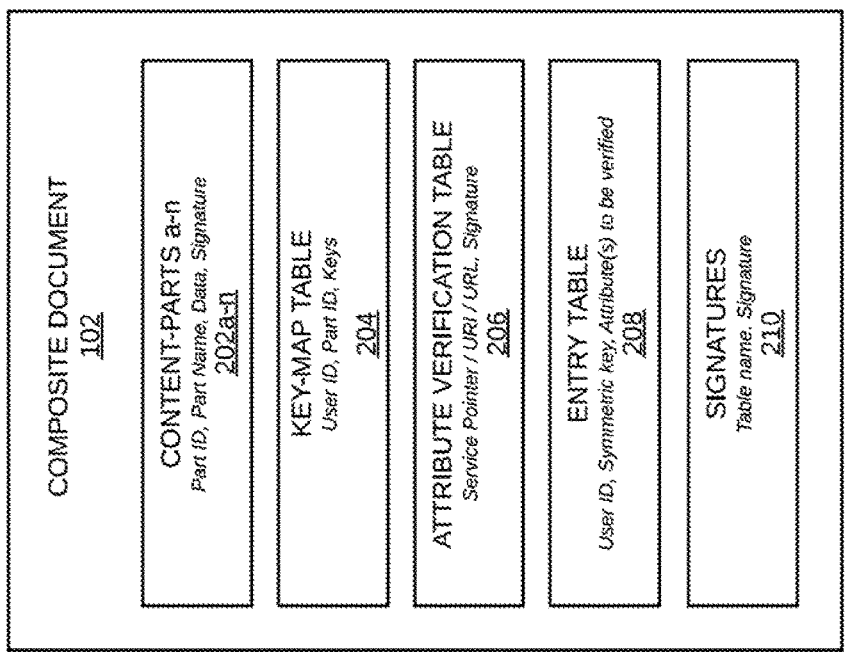
FIG. 2 illustrates a composite document, according to an example of the present disclosure.

FIG. 2 illustrates a composite document, according to an example of the present disclosure. Content-parts 202a-n, in an example, may represent individually addressable or separable elements within composite document 102. For example, a content-part 202a-n may be a file, a combination of files, and/or fragments of files, and elements in one content-part may share the same access control across a document workflow.

Key-map table 204 may comprise keys contained in respective key-map entries on a per-user or per-group basis, or for both user and group keys. Key-map table 204 may also comprise user or group identifiers, which may be random or sequential and which match corresponding identifiers in the entry table 208. Key-map table 204 may also comprise a part ID. The keys in key-map table 204 may enable users and/or groups to attain various levels of access to content-parts 202a-n.

Attribute verification table 206 may comprise a pointer, uniform resource identifier, or uniform resource locator to an attribute verification service to be used for attribute verification required to access a composite document. The attribute verification service 206 may be selected by a document master based on service accessibility for each member of a group, capability to provide reliable verification of a specified attribute, or other parameters and preferences. For example, a Microsoft Exchange server located in Palo Alto may be used to verify a group of employees in a "California" group. In some examples, an attribute verification service may be known by or chosen by an access environment. In such cases, the attribute verification service pointer in table 206 may be left as a null value. In some examples, the attribute verification pointer 206 may be signed to prevent forgery, "phishing" attempts, spoofing, link manipulation, and other activity. In some examples, the pointer 206 may be an obfuscated or shortened link.

Entry table 208 may comprise at least one key, e.g., a symmetric key, used to unlock entries in a key map table in a composite document. Entry table 208 may also comprise an attribute or attributes to be verified for a particular user or group, as discussed below in more detail. Entry table 208 may also comprise user or group identifiers, which may be random or sequential and which may match corresponding identifiers in the key-map table 204.

Signatures table 210 may comprise signatures to digitally sign a composite document or tables within a composite document.

Figure 3:
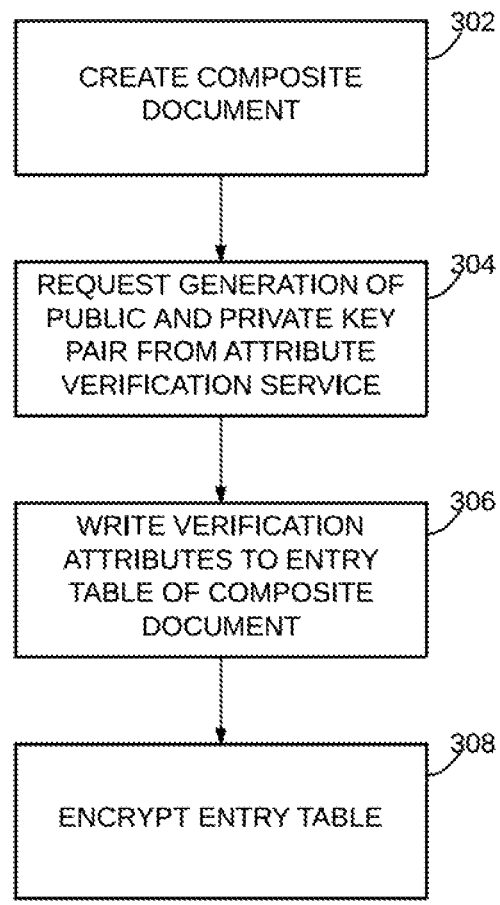
FIG. 3 illustrates a flow diagram of creating a composite document, according to an example of the present disclosure.

FIG. 3 illustrates a flow diagram of creating a composite document, according to an example of the present application. In block 302, in some examples, a composite document is created, updated, or edited on an authoring environment or other tool.

In block 304, in an example, the authoring environment 102 or other tool requests generation of a public and private key pair from attribute verification service 108, and receives the public key from the attribute verification service 108. In some examples, authoring environment 102 may internally generate or import the public and private keys.

In block 306, authoring environment 102 or other tool writes a verification attribute to the entry table 208 of the composite document 104. In some examples, a user or an authoring environment 102 may determine a reliable attribute or attributes provable by every member of a particular group granted access to a content-part or parts. In other examples, an author may determine an attribute or attributes to be used. In some examples, block 306 may also determine or write an attribute verification service pointer to attribute verification table 206.

In block 308, in an example, entry table 208 is encrypted using a public key. In some examples, hybrid encryption may also be employed, where a symmetric key is created, and the symmetric key is encrypted by the public key. The encrypted symmetric key may then be placed into the entry table row, and the remaining rows of the entry table, including attributes to be verified, and the corresponding entries in the key-map table may be encrypted by the symmetric key. In an example where authoring environment 102 has generated a key pair, authoring environment 102 may securely transmit the private key, or both the public and private key, to attribute verification service 108.

Figure 4:
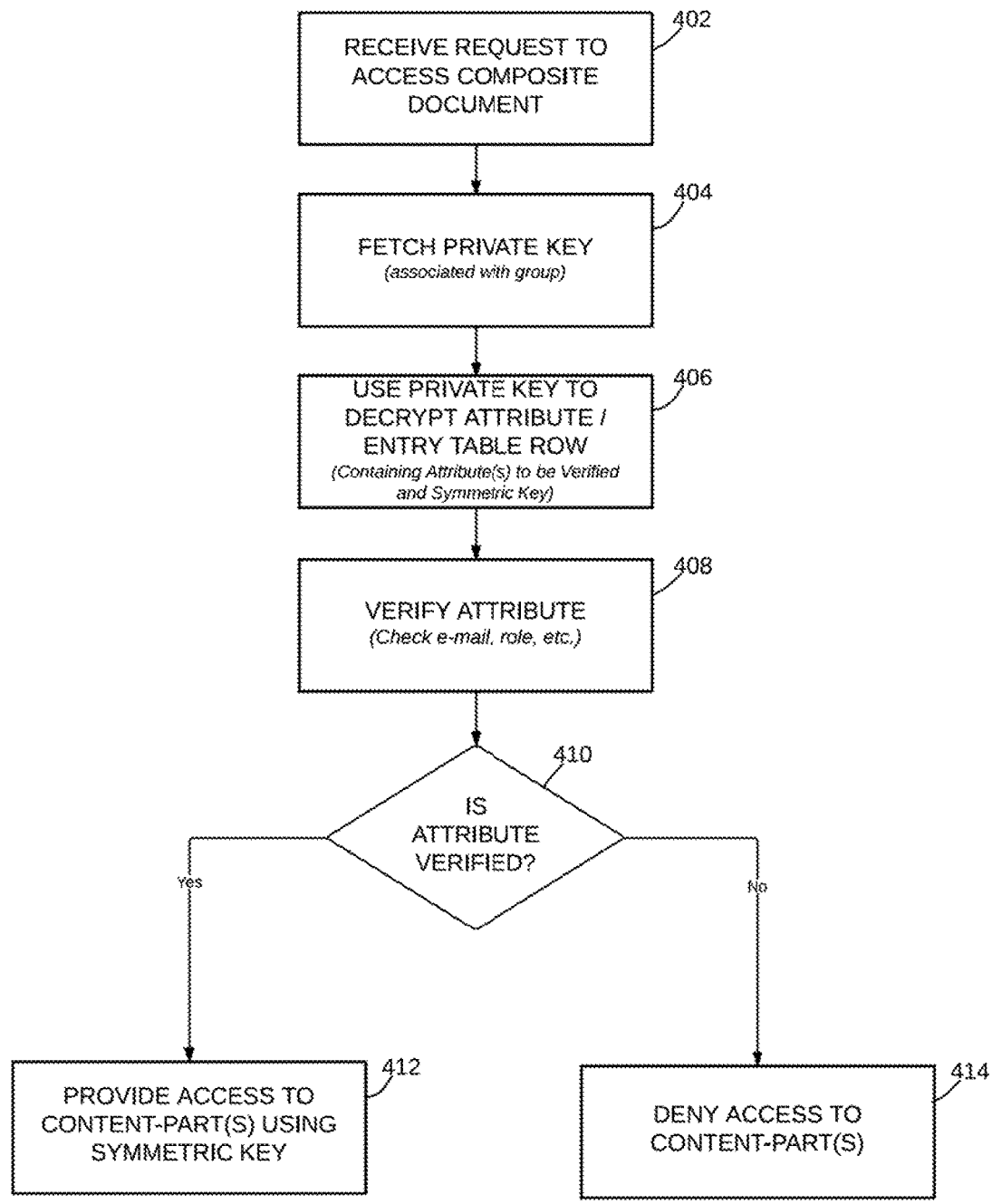
FIG. 4 illustrates a flow diagram of accessing a composite document, according to an example of the present disclosure.

FIG. 4 illustrates a flow diagram of accessing a composite document, according to an example of the present disclosure. In an example, a user requests access to a composite document on access environment 106, which determines the attribute verification and confirms the authenticity of the attribute verification table 206. Following successful verification of the attribute verification table 206 and/or other parts of the composite document, the request to access the document is sent from the access environment 106 to the attribute verification service 108 and received in block 402.

In some examples, the attribute verification service 108 may be determined based on data stored in attribute verification table 206 in composite document 102, or may be known by or determined by access environment 106.

In block 404, attribute verification service 108 may then fetch a private key assigned to a composite document that, as discussed above, may have been generated by attribute verification service 108, or generated on another service or server and stored on attribute verification service 108 and/or key storage 110. An identifier may be used to associate a composite document with a private key.

In block 406, attribute verification service 108 may then use the private key to decrypt an entry table row for the requested composite document or content-part, which may comprise an attribute to be verified and/or a symmetric key for key-map table rows. In some examples, attribute verification service 108 may access the entry table 208 on access environment 106, while in other examples, access environment 106 may transmit the entry table 208 to attribute verification service 108.

In some examples, attribute verification service 108 may loop through entry table rows until a row can be decrypted. In some examples, attribute verification service 108 may delegate the fetching and decrypting steps of blocks 404 and 406 to another server or service.

In block 408, the attribute or attributes in the entry table are verified, as discussed above. Block 408 may also comprise user interaction during the verification process such as prompting a user to supply information required to verify an attribute. For example, a prompt, e-mail, or text message may be generated that requires user interaction, such as typing in a code sent to the user to verify an attribute.

If an attribute cannot be verified in block 410, access to the requested content-part or composite document is denied in block 414. If the attribute or attributes are verified in block 410, access to the content-part or composite document is provided in block 412 using the symmetric key, extracted and decrypted from the entry table.

Figure 5:
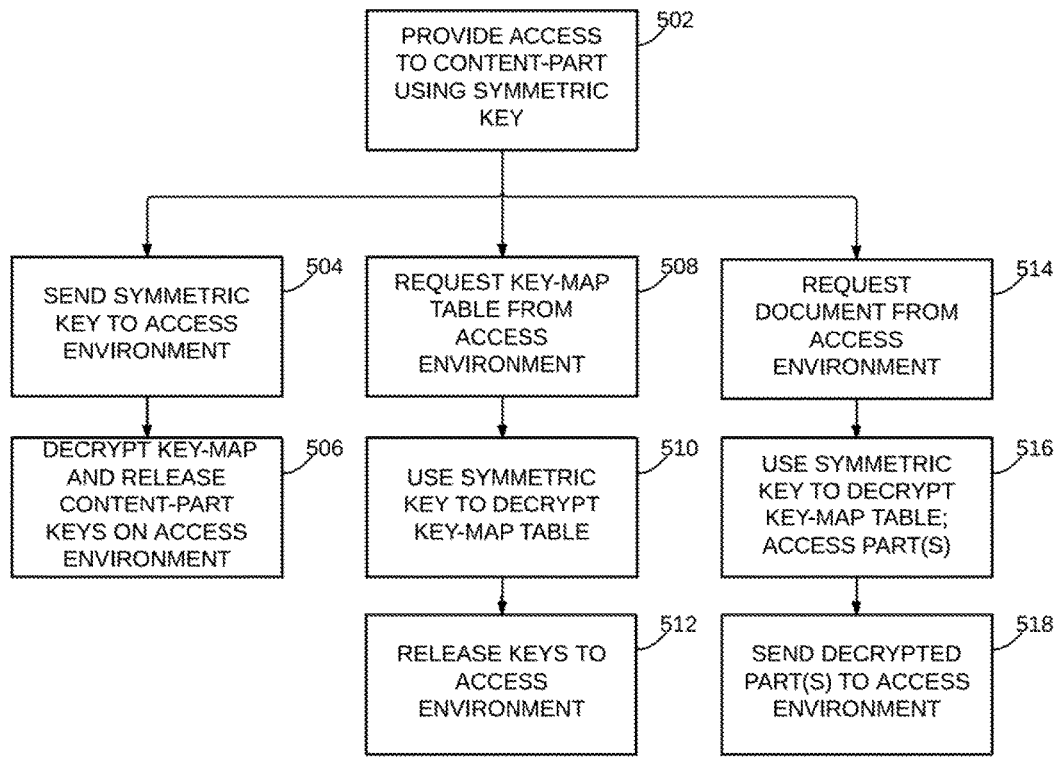
FIG. 5 illustrates a flow diagram of accessing a composite document using a symmetric key, according to an example of the present disclosure.

FIG. 5 illustrates a flow diagram of accessing a composite document using a symmetric key. More specifically, FIG. 5 illustrates three uses cases of providing access to a content-part using a symmetric key, as discussed above with respect to block 412.

In block 504, in a first example, attribute verification service 108 sends the symmetric key back to access environment 106 over a secure communication channel or in an encrypted form. The access environment 106 may use the symmetric key to decrypt key-map table 204 in block 506, which can release at least one content-part key to decrypt a content-part of the composite document.

In block 508, in a second example, attribute verification service 108 requests the key-map table 204 from access environment 106, uses the symmetric key, extracted and decrypted from the entry table, to decrypt the key-map table 204 in block 510. Access environment 106 then releases at least one content-part key in block 512 to decrypt a content-part of the composite document.

In block 514, in a third example, attribute verification service 108 requests the composite document from access environment 106. In block 516, the attribute verification service 108 uses the symmetric key to decrypt the key-map table 204 and access a content-part, and sends the decrypted document or part back to access environment 106 in block 518.

Figure 6:
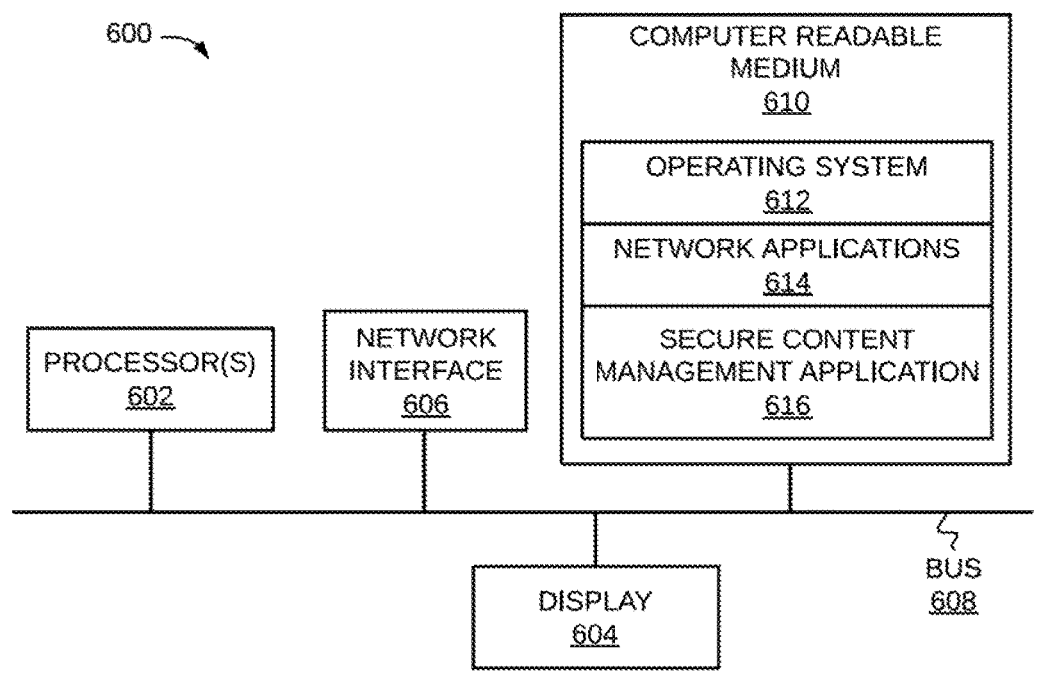
FIG. 6 illustrates a schematic representation of a computing device that may be used as a platform for implementing or executing at least one of the processes depicted in FIGS. 3-6, according to an example of the present disclosure.

FIG. 6 illustrates a schematic representation of a computing device that may be used as a platform for implementing or executing at least one of the processes depicted in FIGS. 3-6, according to an example of the present disclosure.

Some or all of the operations set forth in the figures may be contained as a utility, program, or subprogram in any desired computer readable storage medium, or embedded on hardware. In addition, the operations may be embodied by machine-readable instructions. For example, they may exist as machine-readable instructions in source code, object code, executable code, or other formats.

Computing device 600 may represent a device that comprises authoring environment 102, access environment 106, attribute verification service 108, and key storage 110. The device 600 may include a processor 602 such as a central processing unit; a display device 604, such as a monitor or other digital display; a network interface 606, such as a Local Area Network LAN card, a wireless 802.11x LAN card, a 3G or 4G mobile WAN or a WiMax WAN card; and a computer-readable medium 610. Each of these components may be operatively coupled to a bus 608. For example, the bus 608 may be EISA, PCI, USB, and/or FireWire.

The computer readable medium 610 may be any suitable medium that participates in providing instructions to the processor(s) 602 for execution. For example, the computer readable medium 610 may be non-volatile media, such as an optical or a magnetic disk; and volatile media, such as memory. Transmission media can also take the form of acoustic, light, or radio frequency waves. The computer readable medium 610 may also store other machine-readable instructions, including instructions downloaded from a network or the internet.

The computer-readable medium 610 may also store an operating system 612, such as Microsoft Windows, Mac OS, Unix, or Linux; network applications 614 such as network interfaces and/or cloud interfaces; and a secure content management application 616. The operating system 612 may be multi-user, multiprocessing multitasking, multi-threading, real-time, and the like. The operating system 612 may also perform basic tasks, such as recognizing input from input devices, such as a keyboard or a keypad; sending output to the display 604; keeping track of files and directories on medium 610; controlling peripheral devices, such as drives, printers, or image capture devices; and managing traffic on the bus 608. The network applications 614 may include various components for establishing and maintaining network connections, such as machine readable instructions for implementing communication protocols including but not limited to TCP/IP, HTTP, Ethernet, USB, and FireWire.

The authoring environment 102, access environment 106, attribute verification service 108, and key storage 110 may provide various machine readable instructions for managing access to secure content, as described above. In certain examples, some or all of the processes performed may be integrated into the operating system 612. In certain examples, the processes may be at least partially implemented in digital electronic circuitry, in computer hardware, in machine readable instructions (such as firmware and/or software), or in any combination thereof.

What has been described and Illustrated herein are various examples of the present disclosure along with some of their variations. The terms, descriptions and figures used herein are set forth by way of illustration only and are not meant as limitations. Many variations are possible within the spirit and scope of the present disclosure, wherein the present disclosure is intended to be defined by the following claims, and their equivalents, in which all terms are meant in their broadest reasonable sense unless otherwise indicated.

What is claimed is:

1. A method performed by a system comprising a hardware processor, comprising:
   receiving a request to access a composite document;
   fetching a key associated with a group;
   using the key to decrypt a part of the composite document comprising an attribute;
   verifying the attribute via an attribute verification service, the verifying of the attribute selected from among determining membership in a group of users, determining a location of a user, or determining whether the user is accessing the composite document from a specified network address; and
   in response to the verifying of the attribute, providing access to the composite document and receiving a further key;
   decrypting, using the further key, key-map information of the composite document to fetch a content-part key from the decrypted key-map information; and
   accessing a content-part of the composite document using the fetched content-part key.

2. The method according to claim 1, wherein the key is a private key.

3. The method according to claim 1, wherein the key is stored on a server used for verifying the attribute.

4. The method according to claim 1, wherein providing the access to the composite document comprises providing access to at least one content-part of the composite document.

5. The method according to claim 1, wherein providing the access to the composite document comprises sending a symmetric key to an access environment to decrypt a key-map and releasing a key from the key-map to decrypt a part of the composite document.

6. The method according to claim 1, wherein providing the access to the composite document comprises requesting a key-map table from an access environment, using a symmetric key to decrypt the key-map table, and releasing a key from the key-map to the access environment.

7. The method according to claim 1, wherein providing the access to the composite document comprises requesting the composite document from an access environment, using a symmetric key to decrypt a key-map table and access at least one content-part, and sending at least one decrypted content-part to the access environment.

8. The method according to claim 1, wherein the composite document comprises a plurality of content-parts that are individually addressable, the key-map information comprising content-part keys, and attribute verification information comprising a reference to an attribute verification service to be used for attribute verification, the method further comprising:
   identifying the attribute verification service using the attribute verification information in the composite document,
   wherein verifying the attribute uses the attribute verification service.

9. The method according to claim 8, further comprising:
   prompting, by the attribute verification service, user input to verify the attribute.

10. A computer system comprising:
    a processor; and
    a non-transitory storage medium storing an attribute verification service, when executed, cause the processor to:
       receive a request to access a composite document comprising an entry including an attribute to be verified, and attribute verification information comprising a reference to the attribute verification service,
       fetch a private key associated with a group stored on the attribute verification service,
       use the private key to decrypt the entry comprising the attribute,
       verify the attribute via an attribute verification service, and
       in response to verifying the attribute, provide access to the composite document and receive a symmetric key;
       decrypt, using the further key, key-map information of the composite document to fetch a content-part key from the decrypted key-map information; and
       access a content-part of the composite document using the fetched content-part key.

11. The system according to claim 10, wherein the private key is generated by the attribute verification service.

12. The system according to claim 10, wherein the composite document further comprises key-map information comprising content-part keys, wherein the attribute verification service is to use a symmetric key from the composite document to decrypt the key-map information and to retrieve a content-part key from the decrypted key-map information to decrypt a content-part of the composite document.

13. The system according to claim 10, wherein the attribute is selected from among a membership in a group of users, a location, or a network address.

14. A non-transitory computer readable storage medium comprising instructions that upon execution cause a system to:
receive a request to access a composite document an entry comprising an attribute to be verified; and attribute verification information comprising a reference to an attribute verification service, the attribute selected from among a membership in a group of users, a location, or a network address;
fetch a key associated with a group;
use the key to decrypt the entry in the composite document;
verify, using the attribute verification service referenced by the reference in the attribute verification information of the composite document, the attribute stored in the decrypted entry;
in response to verifying the attribute, provide access to the composite document and receive a symmetric key;
decrypt, using the further key, key-map information of the composite document to fetch a content-part key from the decrypted key-map information; and
access a content-part of the composite document using the fetched content-part key.

15. The non-transitory computer readable storage medium according to claim 14, wherein the composite document further comprises key-map information comprising content-part keys, wherein the attribute verification service is to use a symmetric key from the composite document to decrypt the key-map information and to retrieve a content-part key from the decrypted key-map information to decrypt a content-part the composite document.

\* \* \* \* \*

UNITED STATES PATENT AND TRADEMARK OFFICE
CERTIFICATE OF CORRECTION

PATENT NO. : 10,452,855 B2
APPLICATION NO. : 15/309812
DATED : October 22, 2019
INVENTOR(S) : Vali Ali et al.

Page 1 of 1

It is certified that error appears in the above-identified patent and that said Letters Patent is hereby corrected as shown below:

In the Claims

Column 9, Line 8, Claim 14, delete "verified;" and insert -- verified, --, therefor.

Column 10, Line 17, Claim 15, after "part" insert -- of --.

Signed and Sealed this
Seventeenth Day of December, 2019

Andrei Iancu
*Director of the United States Patent and Trademark Office*